United States Patent
Yanai

(10) Patent No.: US 8,553,087 B2
(45) Date of Patent: Oct. 8, 2013

(54) VEHICULAR IMAGE DISPLAY SYSTEM AND IMAGE DISPLAY CONTROL METHOD

(75) Inventor: Tatsumi Yanai, Yokohama (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 1755 days.

(21) Appl. No.: 11/008,186

(22) Filed: Dec. 10, 2004

(65) Prior Publication Data

US 2005/0128061 A1   Jun. 16, 2005

(30) Foreign Application Priority Data

Dec. 10, 2003  (JP) ............................. P 2003-411626

(51) Int. Cl.
 *B60W 30/12*  (2006.01)
 *B60W 30/08*  (2012.01)
 *H04N 7/18*   (2006.01)
 *B60W 30/10*  (2006.01)

(52) U.S. Cl.
 USPC ............ 348/148; 701/300; 701/301; 701/302

(58) Field of Classification Search
 USPC ............ 348/147, 159, 211.11, 148; 340/933, 340/937, 938; 701/300–302
 See application file for complete search history.

(56) References Cited

U.S. PATENT DOCUMENTS

| | | | | |
|---|---|---|---|---|
| 4,713,685 A * | 12/1987 | Nishimura et al. | ........... | 348/148 |
| 5,521,633 A * | 5/1996 | Nakajima et al. | ............. | 348/118 |
| 5,680,123 A * | 10/1997 | Lee | ................................ | 340/937 |
| 6,172,601 B1 * | 1/2001 | Wada et al. | ................... | 340/436 |
| 6,218,960 B1 * | 4/2001 | Ishikawa et al. | ............. | 340/901 |
| 6,222,447 B1 * | 4/2001 | Schofield et al. | ............. | 340/461 |
| 6,311,119 B2 * | 10/2001 | Sawamoto et al. | ............. | 701/96 |
| 6,411,898 B2 * | 6/2002 | Ishida et al. | .................. | 701/211 |
| 6,476,855 B1 * | 11/2002 | Yamamoto | .................... | 348/148 |
| 6,746,855 B2 * | 6/2004 | Kreutzer et al. | ............. | 435/115 |
| 6,911,997 B1 * | 6/2005 | Okamoto et al. | ............. | 348/148 |
| 2002/0087269 A1 * | 7/2002 | Sasaki et al. | .................. | 701/301 |
| 2002/0196340 A1 * | 12/2002 | Kato et al. | .................... | 348/148 |
| 2003/0095182 A1 * | 5/2003 | Imoto | .......................... | 348/148 |
| 2003/0137586 A1 * | 7/2003 | Lewellen | ...................... | 348/148 |
| 2003/0151835 A1 * | 8/2003 | Su et al. | ........................ | 359/843 |
| 2003/0156015 A1 * | 8/2003 | Winner et al. | ............. | 340/425.5 |

FOREIGN PATENT DOCUMENTS

EP   1150252 A2 * 10/2001

(Continued)

OTHER PUBLICATIONS

Machine translation of JP-2000-011298 A (Jan. 14, 2000).*

(Continued)

*Primary Examiner* — David Czekaj
*Assistant Examiner* — David N Werner
(74) *Attorney, Agent, or Firm* — McDermott Will & Emery LLP

(57) ABSTRACT

An image display system provided on a vehicle, which takes a side-rear view image of a first area alongside and to the rear of the vehicle, computes running conditions of the vehicle and an obstacle in the first area using the side-rear view image, determines a time point to start displaying the side-rear view image based on the computed running conditions, and presents the side-rear view image at the time point.

17 Claims, 9 Drawing Sheets

(56) References Cited

FOREIGN PATENT DOCUMENTS

| | | |
|---|---|---|
| JP | 09-071198 | 3/1997 |
| JP | 09-091594 | 4/1997 |
| JP | 2000-011298 | 1/2000 |
| JP | 2002-204446 A | 7/2002 |
| JP | 2003-276542 | 10/2003 |
| JP | 2003-312415 | 11/2003 |

OTHER PUBLICATIONS

Translation of JP-2000-011298, prepared by Scheiber Translations, Inc. (Aug. 2011).*

Japanese Notification of Reasons for Refusal, w/ English translation thereof, issued in Japanese Patent Application No. JP 2003-411626 dated Dec. 1, 2009.

* cited by examiner

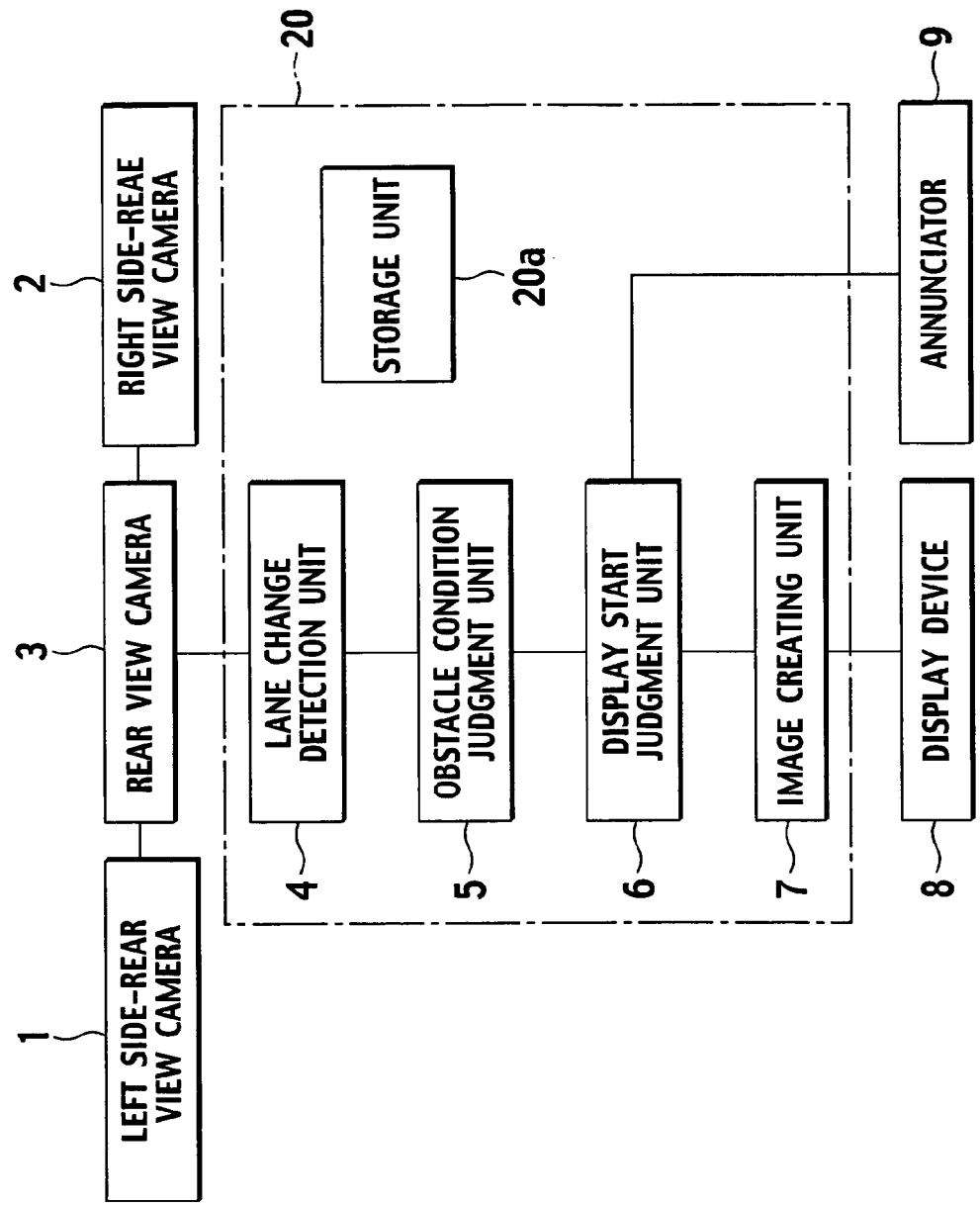

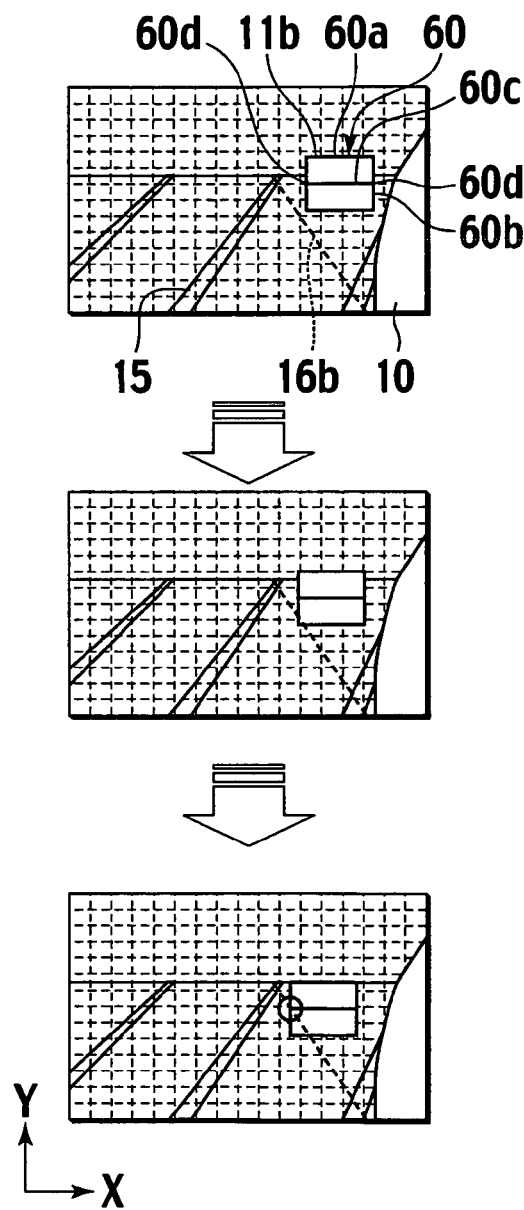
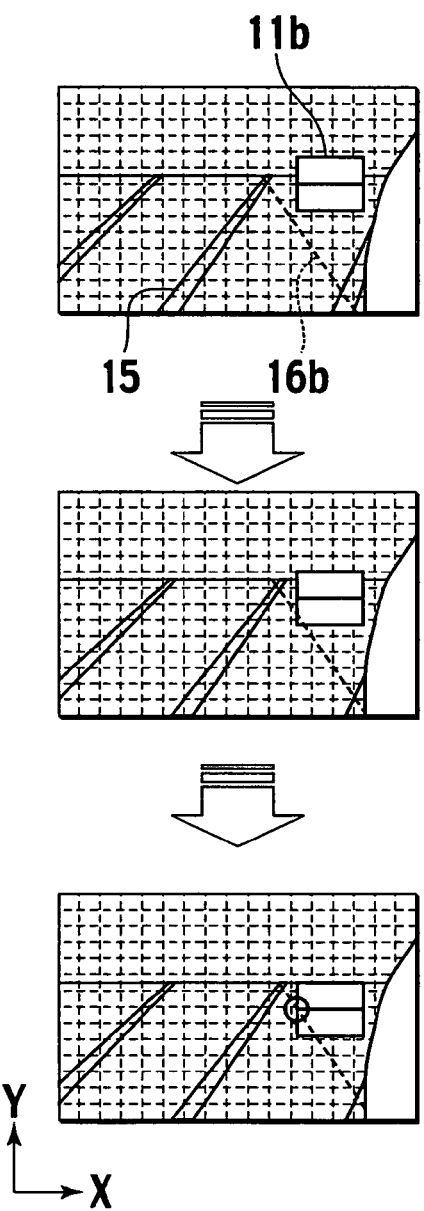

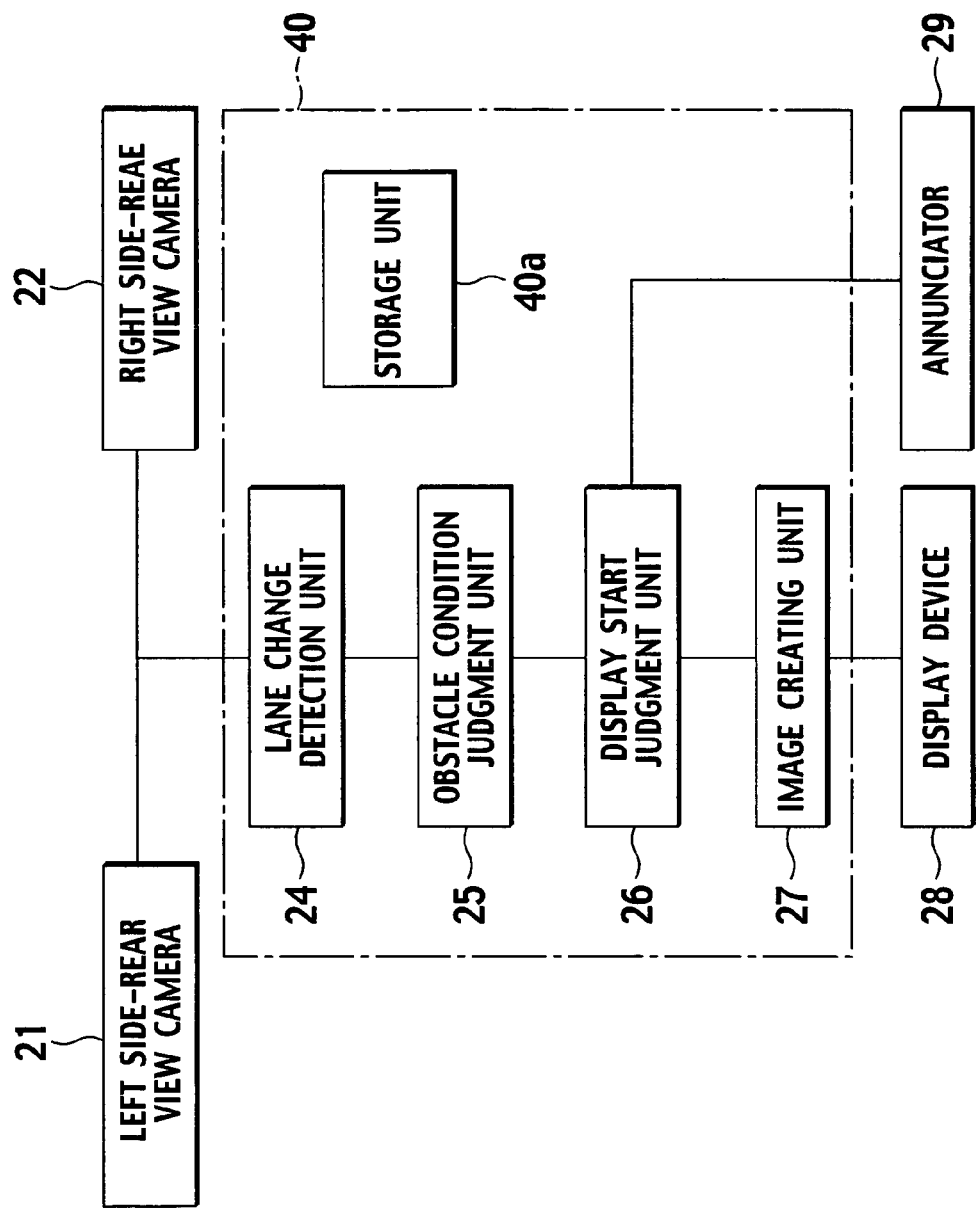

VEHICULAR IMAGE DISPLAY SYSTEM AND IMAGE DISPLAY CONTROL METHOD

BACKGROUND OF THE INVENTION

1. Field of the Invention

The present invention relates to an image display system mounted on a vehicle and an image display control method, particularly to a side obstacle warning system which displays an image of an area alongside and to the rear of a vehicle and to a control method for displaying the image.

2. Description of Related Art

Japanese Patent Application Laid-Open Publication No. 2002-204446 discloses an on-vehicle device which displays an image of an adjacent lane area when a direction indicator is operated for entering the adjacent lane.

SUMMARY OF THE INVENTION

In the aforementioned device, the direction indicator needs to be operated, every time the driver checks the adjacent lane area, having the image thereof displayed.

The present invention is made in the light of this problem. An object of the present invention is to provide an image display system for a vehicle, which automatically provides the driver with information on areas around the vehicle, displaying images of areas alongside and to the rear of the vehicle, without requiring any manual switch operations, and to provide a image display control method for a vehicular system.

An aspect of the present invention is an image display system provided on a vehicle, which takes a side-rear view image of a first area alongside and to the rear of the vehicle, computes running conditions of the vehicle and an obstacle in the first area using the side-rear view image, determines a time point to start displaying the side-rear view image based on the computed running conditions, and presents the side-rear view image at the time point.

BRIEF DESCRIPTION OF THE DRAWINGS

The invention will now be described with reference to the accompanying drawings wherein:

FIGS. 2A to 2C show ranges of the areas to be monitored and typical movements of the obstacle in the areas to get the display of an image of the monitored area started when the vehicle stays on the same lane. FIGS. 2D to 2F show ranges of the areas to be monitored and typical movements of the obstacle in the areas to get the display of a highlighted image of the monitored area and an annunciation started when the vehicle changes the lane. FIGS. 2B and 2E show the detection of a running condition of the obstacle within the range of field of view of a rear view camera. FIGS. 2C and 2F show the detection of a running condition of the obstacle within the range of field of view of a side-rear view camera.

FIG. 4 is a block diagram of the image display system according to the first embodiment.

FIG. 6A shows examples of images of the monitored area while the vehicle stays on the same lane, and movement of the obstacle in the area to get the display of an image of the monitored area started, in a image display system according to a second embodiment of the present invention.

FIG. 6B shows examples of images of the monitored area while the vehicle changes the lane, and movement of the obstacle in the area to get the display of an image of the monitored area started, in the image display system according to the second embodiment. Both of FIGS. 6A and 6B show the detection of a running condition of the obstacle within the range of field of view of the side-rear view camera.

FIG. 7 is a block diagram of the image display system according to the second embodiment.

DETAILED DESCRIPTION OF THE PREFERRED EMBODIMENT

Figure 1:
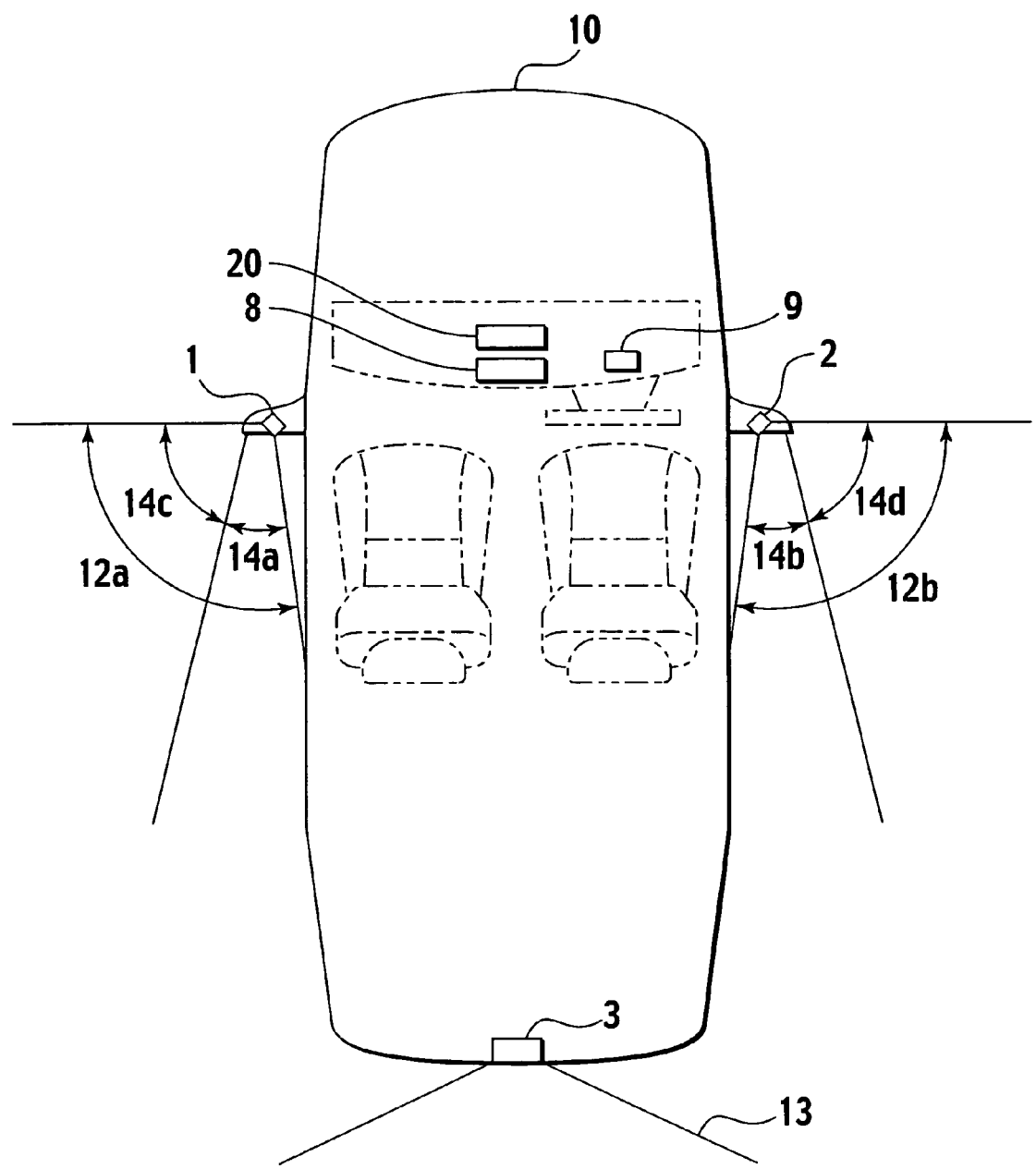
FIG. 1 is a plan view of a vehicle equipped with the image display system according to a first embodiment of the present invention.

Embodiments of the present invention will be explained below with reference to the drawings, wherein like members are designated by like reference characters.

First Embodiment

Obstacle detection system and Image display system using a laser radar, millimeter-wave radar, ultrasonic sensor, and the like, have been put to practical use as means for making the driver recognize obstacles (the other moving objects or vehicles) in the area alongside and to the rear of the vehicle. The obstacle detection system is excellent in that the driver can easily recognize the presence of the other vehicles in the area, however the system still does not eliminate the necessity for the driver to look at the area.

The image display system is excellent in that a driver can visually check the other vehicles in a display screen, however the system has a problem in that the driver is required to manually operate the system to start the display and obtain necessary information. This problem becomes significant especially for the driver whose vehicle is running on a busy road at a high speed.

As shown in FIG. 1, a vehicle 10 is equipped with the image display system according to the first embodiment of the present invention. The system displays images of the areas alongside and to the rear of the vehicle (hereinafter referred to as side-rear view images). A camera 1 for taking an image of an area along the left side and to the rear of the vehicle 10 (hereinafter referred to as a left side-rear view camera) is provided on a left side-mirror of the vehicle 10. A camera 2 for taking an image of an area along the right side and to the rear of the vehicle 10 (hereinafter referred to as a right side-rear view camera) is provided on a right side-mirror of the vehicle 10. A camera 3 for taking another image of another area to the rear of (straight behind) the vehicle 10 (hereinafter referred to as a rear view camera) is provided at the rear end of the vehicle 10.

Figure 2A:
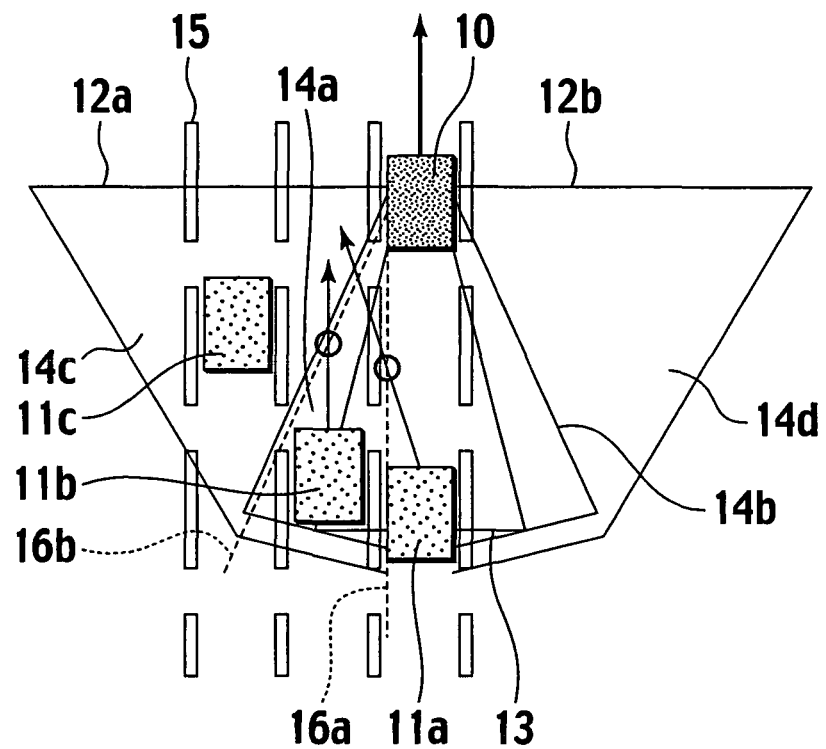
FIGS. 2A to 2F schematically show areas around the vehicle to be monitored by the image display system, relative positions and movements of the obstacles (the other vehicles) in the area, etc., to explain function of the image display system according to the first embodiment.
Figure 2B:
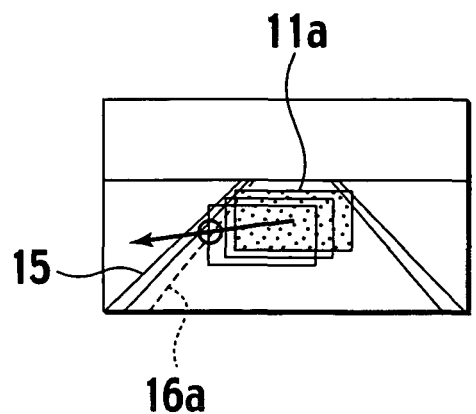
Figure 2C:
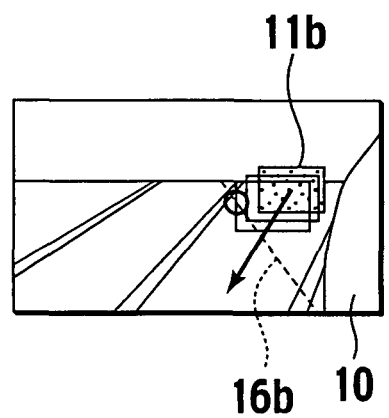
Figure 2D:
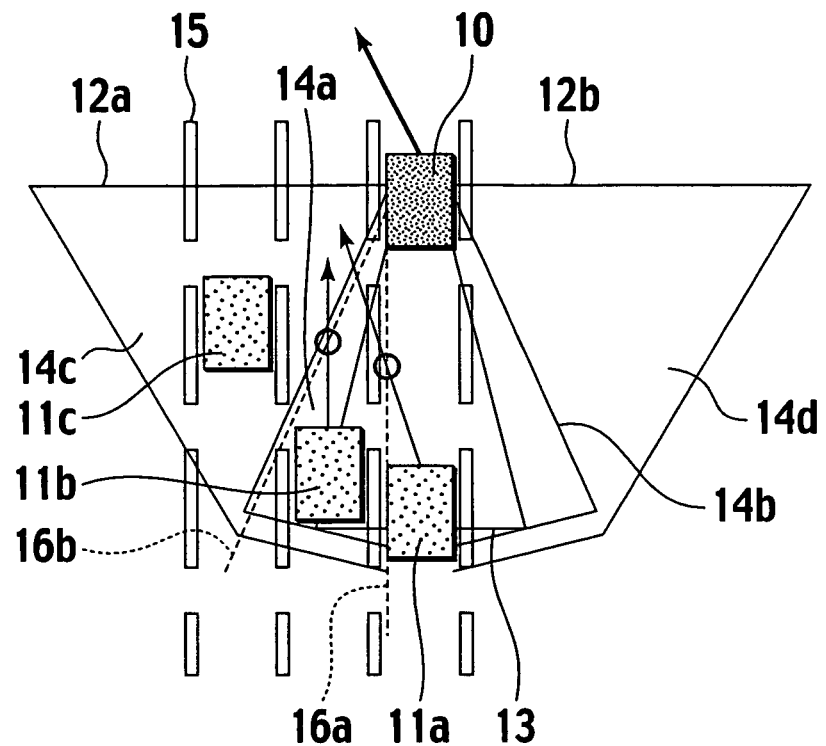

As shown in FIGS. 1, 2A, and 2D, a range of field of view 12a of the left side-rear view camera 1 (hereinafter referred to as a left side-rear camera range) covers an area along the left side and to the rear of the vehicle. A range of field of view 12b of the right side-rear view camera 2 (hereinafter referred to as a right side-rear camera range) covers another area on the right side and to the rear of the vehicle. A range of field of view 13 of the rear view camera 3 (hereinafter referred to as a rear view camera range) covers another area to the rear of the vehicle, partly overlapped with the left and right side-rear camera ranges 12a and 12b.

A range of field of view 14a of a left side-mirror (hereinafter referred to as a left side mirror range) and a range of field of view 14b of a right side-mirror (hereinafter referred to as a right side mirror range) are limited and narrower than the left and right side-rear camera ranges 12a and 12b. The areas outside of the left and right side mirror ranges 14a and 14b in the left and right side-rear camera ranges 12a and 12b are the side-rear blind spot area ranges 14c and 14d of the vehicle respectively.

The image display system according to the first embodiment presents necessary information to the driver, automatically displaying one of the side-rear view images at the right time while the vehicle 10 is running at a high speed, for example.

The vehicle 10 is now running on a road with a plurality of lanes each way. Each lane is ruled off by the white or yellow solid or dashed track lane markers 15 on the road.

All of the rear view image, and the left and right side-rear view images as shown in FIGS. 2A to 2F (hereinafter referred to as all rear view images) are continuously taken by the cameras 1, 2, 3 while the vehicle 10 is running. Image processing is then performed on the all rear view images to detect the track lane markers 15 on the road. Thus, a lane in which the vehicle 10 is running can be specified based on the positions of the detected track lane markers 15 relative to the vehicle 10. This makes it possible to determine whether the vehicle 10 stays on the same lane or is changing the lane. In a similar way, image processing is performed on the all rear view images to detect positions of the other vehicles running in the areas on the sides of and to the rear of the vehicle 10, such as a vehicle 11a running on the same lane as the vehicle 10, a vehicle 11b running on a left lane adjacent to the lane on which the vehicle 10 is running, and a vehicle 11c running on another left lane adjacent to the lane on which the vehicle 11b is running. This makes it possible to determine the running conditions of the other vehicles; such as positional relationships with lanes thereof, lanes on which the other vehicles stay, status of lane changes thereof, and relative positions thereof to the vehicle 10.

FIGS. 2A to 2C show how the display of one of the side-rear view images is started depending on the running conditions of the vehicles 11a to 11c while the vehicle 10 stays on the same lane. If the vehicle 11a running on the same lane as the vehicle 10 changes its lane to the left adjacent one, the vehicle 11a is going to enter the left side-rear blind spot area range 14c of the vehicle 10. Since the vehicle 11a is continuously monitored and the image thereof is taken by the rear view camera 3, processing the rear view image enables determination of the running condition of the vehicle 11a. If the vehicle 11b running on the left lane adjacent to the lane on which the vehicle 10 runs approaches the vehicle 10 in the adjacent lane, the vehicle 11b is also going to enter the left side-rear blind spot area range 14c of the vehicle 10. Since the vehicle 11b is continuously monitored and the image thereof is taken by the left side-rear view cameral, processing the side-rear view image enables determination of the running condition of the vehicle 11b.

In each instance, display start threshold lines 16a and 16b are set in the image processing, each of which has a predetermined positional relationship relative to the lane on which the vehicle 10 is now running. The display of the side-rear view image can be started depending on whether or not a part of each of the vehicles 11a to 11c passes the display start threshold lines 16a and 16b. This enables to start the display before the vehicles 11a and 11c enter the side-rear blind spot area ranges 14c.

Figure 2E:
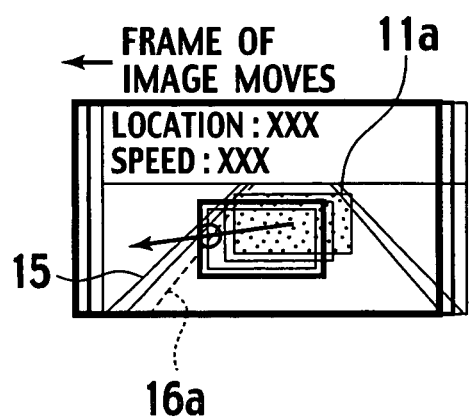
Figure 2F:
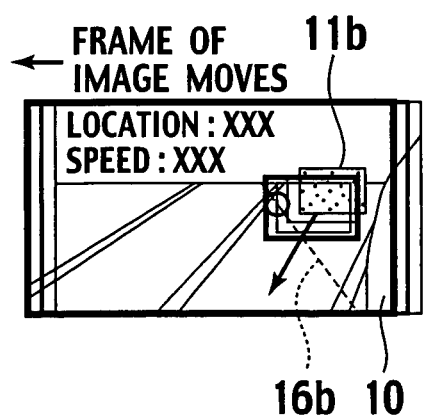

FIGS. 2D to 2F show how the display of a highlighted side-rear view image and an annunciation are started when the vehicle 10 changes the lane to the left adjacent one. If the vehicle 11a running on the same lane as the vehicle 10 changes its lane to the left adjacent one, the vehicle 11a is going to enter the left side-rear blind spot area range 14c of the vehicle 10. Since the vehicle 11a is continuously monitored and the image thereof is taken by the rear view camera 3, processing the rear view image enables determination of the running condition of the vehicle 11a. If the vehicle 11b running on the left lane adjacent to the lane on which the vehicle 10 runs approaches the vehicle 10 in the adjacent lane, the vehicle 11b is also going to enter the left side-rear blind spot area range 14c of the vehicle 10. Since the vehicle 11b is continuously monitored and the image thereof is taken by the left side-rear view camera 1, processing the side-rear view image enables determination of the running condition of the vehicle 11b.

In each instance, display start threshold lines 16a and 16b are set in the image processing, each of which has a predetermined positional relationship relative to the lane on which the vehicle 10 is now running. The display of the side-rear view image can be started depending on whether or not a part of each of the vehicles 11a to 11c passes the display start threshold lines 16a and 16b. This enables to start the display before the vehicles 11a and 11c enter the side-rear blind spot area ranges 14c. When the vehicle 10 changes its lane, the vehicle 10 itself approaches the other vehicles 11a to 11c which may enter the side-rear blind spot area range 14c of the vehicle 10. In this case, the highlighted side-rear view image will be displayed with the annunciation started to get the driver alerted. In the highlighted side-rear view image, the one of the other vehicles 11a to 11c which passes one of the display start threshold lines 16a and 16b will be displayed with its counter highlighted. The annunciation includes beeping or display of the running condition data such as positions, directions, speed, and the like of the vehicle related (refer to FIGS. 2E and 2F) on a presenting device (display device).

Figure 3A:
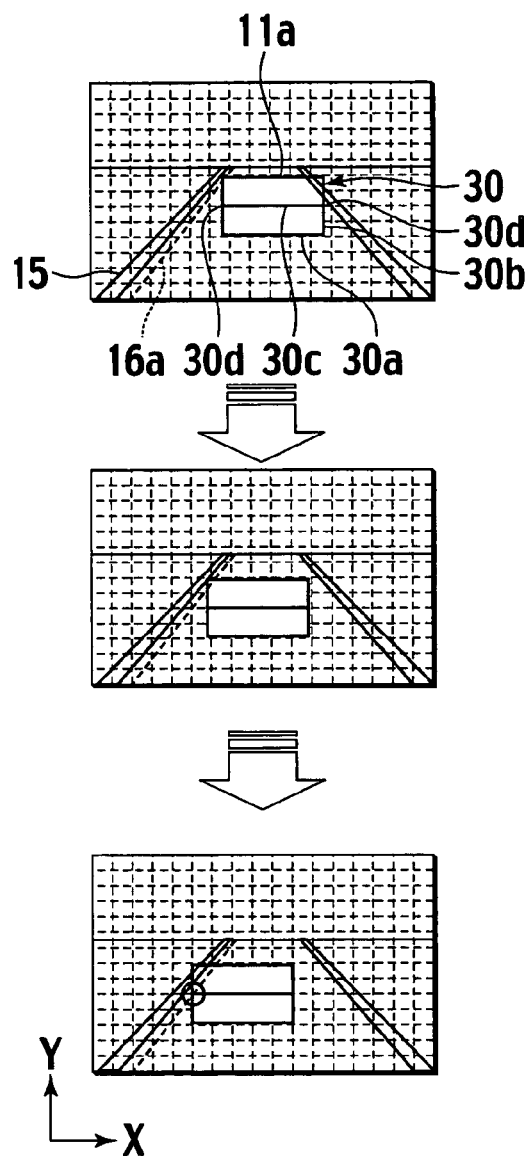
FIG. 3A shows examples of images of the monitored area while the vehicle stays on the same lane, and movement of the obstacle in the area to get the display of an image of the monitored area started, in the image display system according to the first embodiment.
Figure 3B:
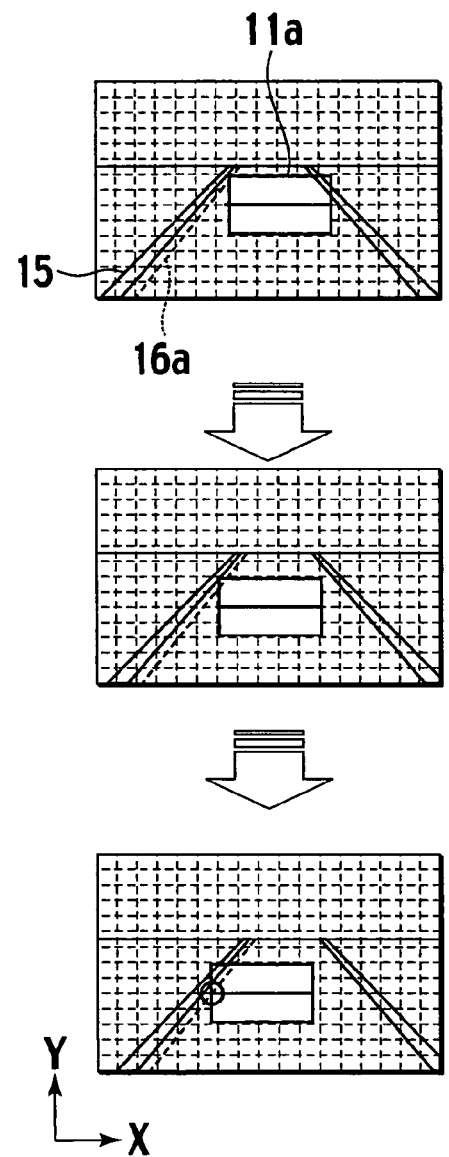
FIG. 3B shows examples of images of the monitored area while the vehicle changes the lane, and movement of the obstacle in the area to get the display of an image of the monitored area started, in the image display system according to the first embodiment. Both of FIGS. 3A and 3B show the detection of a running condition of the obstacle within the range of field of view of the rear view camera.

The images of FIG. 3A show how the lane of the vehicle 10 and the running condition of the vehicle 11a are detected. Time elapses from upper to lower as indicated by the arrows between the images. Each image is separated into segments. The image data of the segments are subjected to a contour extracting process to specify the positions of the track lane markers 15 and of the vehicle 11a on the segments. The lane change made by the vehicle 10 can be detected if the track lane markers 15 change their positions in each segment in a horizontal direction (x-axis). The running condition of the vehicle 11a can be determined based on the positional relationship between a given point within the region of the vehicle 11a on the image and the display start threshold line 16a. In this embodiment, the region of the vehicle 11a refers to a rectangular region 30 defined by two horizontal lines 30a passing through the uppermost and the lowermost points on the extracted contour lines of the vehicle 11 and two vertical lines 30b passing through the leftmost and the rightmost points on the contour line, and the above-mentioned given point refers to each of the left and right end points 30d of a horizontal line segment 30c passing through a center point of the region 30. In this embodiment, when either of the points 30d passes the display start threshold line 16a outward as shown in the images at the bottom of FIGS. 3A and 3B, the side-rear view image is started to be displayed. As shown in FIGS. 3A and 3B, the display start threshold line 16a is set along each of the side edges of the lane on which the vehicle 10 is running (inside the track lane markers 15) when the vehicle 11a is in the area to the rear of the vehicle 10. This method is well applicable even if a plurality of vehicles are detected in the area in a overlapping manner. The running conditions of the vehicle 11a are not different, but those of the vehicle 10 are different between FIGS. 3A and 3B. The images of FIG. 3A indicate the vehicle 10 staying on the same lane, since the lane on which the vehicle 10 is running and the vehicle 11a maintain their horizontal position in the images. The images of FIG. 3B indicate the vehicle 10 changing the lane, since the lane on which the vehicle 10 is running and the vehicle 11a change their horizontal position in the images.

As shown in FIG. 4, the image display system in the first embodiment includes the left side-rear view camera 1, the right side-rear view camera 2, the rear view camera 3, the controller 20 for processing data of the images taken by these cameras 1 to 3 and determining when to start displaying, a display device 8 for presenting one of the side-rear view images to the driver, and an annunciator 9 for making an acoustic warning signal such as a beep.

The controller 20 is provided inside the dashboard of the vehicle 10 (FIG. 1) and has a lane change detection unit 4 (first running condition computing unit) for determining the lane on which the vehicle 10 is running and detecting the lane change made by the vehicle 10 by processing data of the images taken by the cameras 1 to 3, an obstacle condition judgment unit 5 (second running condition computing unit) for judging the running conditions of the obstacles (the other vehicles 11a to 11c) in the area around and to the rear of the vehicle 10 by processing data of the images taken by the cameras 1 to 3, a display start judgment unit 6 for determining a time point to start display of one of the images taken by the cameras 1 and 2 depending on the lane on which the vehicle 10 is running or the lane change made by the vehicle 10 detected by the lane change detection unit 4 and the running conditions of the obstacles detected by the obstacle condition judgment unit 5, an image creating unit 7 for creating an highlighted images depending on the lane on which the vehicle 10 is running and the lane change made by the vehicle 10 detected by the lane change detection unit 4 and the running conditions of the obstacles detected by the obstacle running condition computing unit 5, and a storage unit 20a for storing image data.

The display device 8 is provided on the dashboard of the vehicle 10 (FIG. 1) and displays the side-rear view image (or may be the rear view image) which may be highlighted by the image creating unit 7 at the time point determined by the display start judgment unit 6 of the controller 20.

The annunciator 9 is provided in the vicinity of a driver's seat and beeps at the time point determined by the display start judgment unit 6 of the controller 20.

Figure 5:
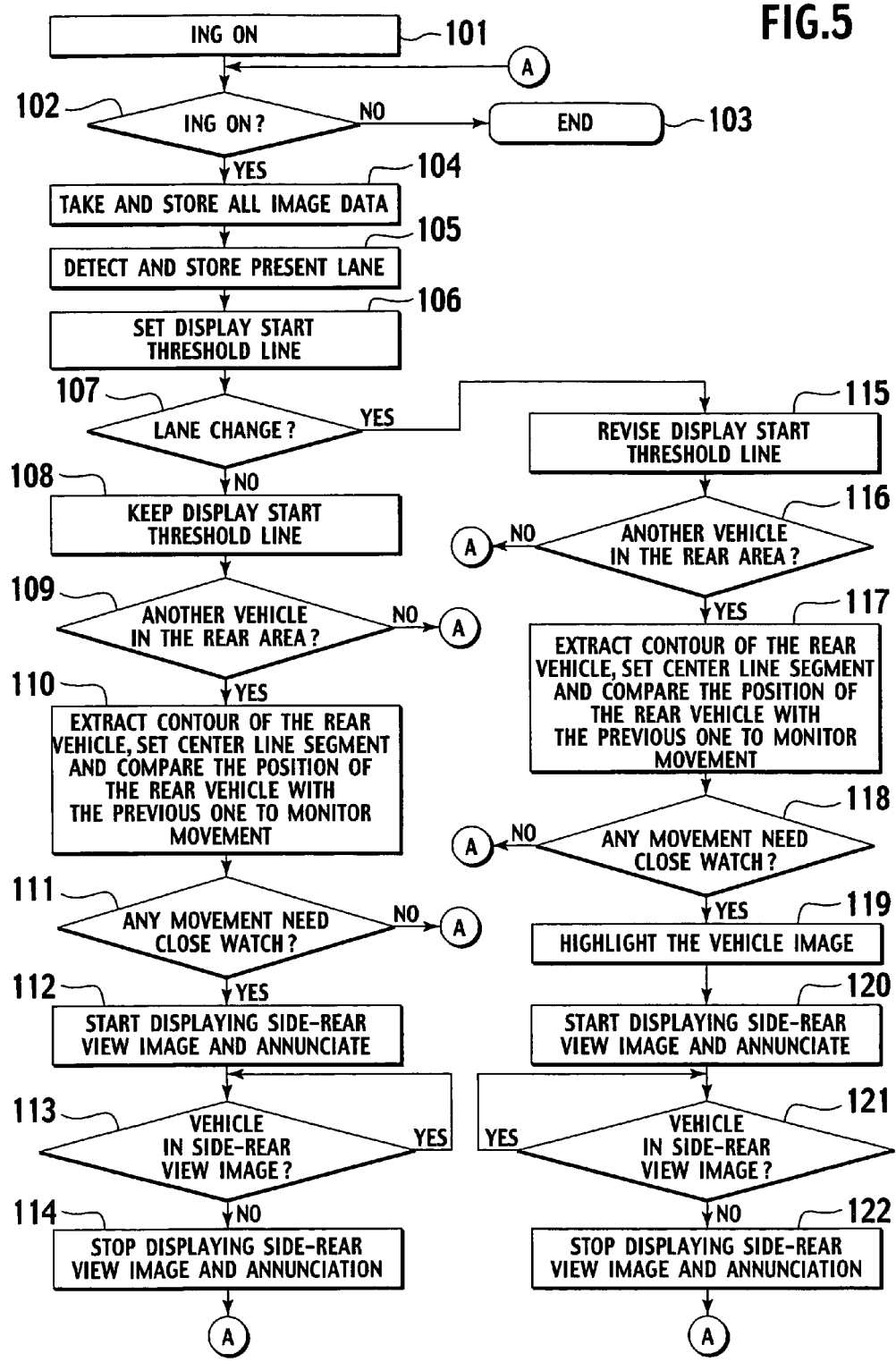
FIG. 5 shows a control flow chart of the image display system according to the first embodiment.

The lane change detection unit 4, the obstacle condition judgment unit 5, the display start judgment unit 6, and the image creating unit 7 in the controller 20 are control functions executed by a processor according to the flow chart shown in FIG. 5.

The display control flow of the image display system of the first embodiment will be described below with reference to the flow chart in FIG. 5.

When the driver turns the ignition ON in step 101, check is made to determine if the ignition is turned ON in step 102. If it is determined the ignition is turned OFF, the process ends in Step 103. If it is determined the ignition is turned ON, all data of images taken by the cameras 1 to 3 are read and stored in the storage unit 20a in Step 104.

Subsequently, in step 105, all image data are processed to specify the lane on which the vehicle 10 is running and then data of the lane is stored in the storage unit 20a.

Next, in step 106, a display start threshold line 16a is set based upon the specified lane of the vehicle 10 and data of the display start threshold line 16a is stored in the storage unit 20a.

In step 107, check is made to determine if the vehicle 10 is changing a lane. If it is determined that the vehicle 10 stays the same lane, the display start threshold line set in Step 106 is maintained (Step 108). If it is determined that the vehicle 10 is changing the lane, the display start threshold line 16a is revised according to the lane change made by the vehicle 10 (Step 115).

In step 109, data of all rear view images are processed to determine if there is the other vehicle 11a in the area to the rear of the vehicle 10. If it is determined that there is no other vehicle in the area, the process returns to Step 102. If it is determined that there is the other vehicle 11a in the area, a contour of the vehicle 11a is extracted and the line segment 30c in the region 30 of the vehicle 11a is set by image processing, and data of the contour of the vehicle 11a and the line segment 30c are stored in the storage unit 20a in Step 110.

Then, the positional relationship between the end points 30d of the line segment 30c and the display start threshold line 16a of the vehicle 11a in the image data currently processed (latter frame) are compared with those of the same vehicle 11a in the image data previously processed (former frame). In step 111, when the vehicle 11a shows movements on which the driver of the vehicle 10 needs to keep a close watch, in other words, when the end points 30d of the line segment 30c of the vehicle 11a previously lying inside the display start threshold line 16a on the former frame moved to the outside thereof on the latter frame, process proceeds to Step 112 to start the display of the side-rear view image and to beep as well. If the vehicle 11a shows no movement need to be closely watched, process returns to step 102.

Next, in Step 113, it is determined whether or not there is the other vehicle 11a in the area in the side-rear view camera range. If the other vehicle 11a is found to be in the area, the Step 113 is executed again to trace the vehicle 11a. If the other vehicle 11a is not found in the area, the display of the side-rear view image and the annunciation will be stopped in step 114, and then the process returns to step 102.

In step 115, the display start threshold line 16a is revised according to the lane change made by the vehicle 10. In other words, the position of each line element of the display start threshold line 16a on the screen image (the image in the screen frame) is revised so as to keep a given distance in a direction of x-axis (abscissa) on the screen image from the side edge of the lane on which the vehicle 10 is running or the track lane markers 15 (so that each line element of the display start threshold line 16a maintains its position in the x-axis direction relative to side edge of the lane of the vehicle 10 or the track lane markers 15). Each line element maintains its position in a direction of Y-axis (ordinate) on the screen image.

Next, in step 116, as is the same with Step 109, data of all rear view images are processed to determine if there is the other vehicle 11a in the area to the rear of the vehicle 10. If it is determined that there is no other vehicle in the area, the process returns to Step 102. If it is determined that there is the other vehicle 11a in the area, a contour of the vehicle 11a is extracted and the line segment 30c in the region 30 of the vehicle 11a is set by image processing, and data of the contour of the vehicle 11a and the line segment 30c are stored in the storage unit 20a in Step 117.

Then, the positional relationship between the end points 30d of the line segment 30c and the display start threshold line 16a of the vehicle 11a in the image data currently processed (latter frame) are compared with those of the same vehicle 11a in the image data previously processed (former frame). In step 118, when the vehicle 11a shows movements on which the driver of the vehicle 10 needs to keep a close watch, in other words, when the end points 30d of the line segment 30c of the vehicle 11a previously lying inside the display start threshold line 16a on the former frame moved to the outside thereof on the latter frame, the boundary of the region 30 or the contour of the vehicle which has shown the movements need to be closely watched is subjected to the highlighting process as shown in FIGS. 2E and 2F in step 119. And then process proceeds to Step 120 to start the display of the side-rear view image and to beep as well. If the vehicle 11a shows no movement need to be closely watched, process returns to step 102.

Next, in Step 121, it is determined whether or not there is the other vehicle 11a in the area in the side-rear view camera range. If the other vehicle 11a is found to be in the area, the Step 121 is executed again to trace the vehicle 11a. If the other vehicle 11a is not found in the area, the display of the side-rear view image and the annunciation will be stopped in step 122, and then the process returns to step 102.

As described above, the image display system according to the first embodiment of the present invention includes the left side-rear view camera 1, the right side-rear view camera 2, and the rear view camera 3. The system further includes the lane change detection unit 4 for determining the lane on which the vehicle 10 is running and detecting the lane change made by the vehicle 10 by processing data of the images taken by the cameras 1 to 3, and the obstacle condition judgment unit 5 for judging the running condition of the obstacles (the other vehicles 11a to 11c) in the area around and to the rear of the vehicle 10 by processing data of the images taken by the cameras 1 to 3. In addition the system includes the display start judgment unit 6 for determining a time point to start displaying of one of the images taken by the cameras 1 and 2 depending on the running condition of the vehicle 10 detected by the lane change detection unit 4 and the running conditions of the other vehicles 11a to 11c detected by the obstacle condition judgment unit 5, and the display device 8 for presenting one of the side-rear view images taken by the cameras 1 and 2 at the time point determined by the display start judgment unit 6.

In the method for controlling the display of the side-rear view image in the first embodiment, images to be processed are taken by the left side-rear view camera 1 and the right side-rear view camera 2, and the rear view camera 3. The taken images are processed to detect the lane on which the vehicle 10 is running and the lane change made by the vehicle 10, and to detect the running conditions of the vehicles 11a to 11c around the vehicle 10. Depending on the lane on which the vehicle 10 is running, the lane change made by the vehicle 10 and the running conditions of the vehicles 11a to 11c, the time point to start displaying the side-rear view image taken by the camera 1 or 2 is determined. The side-rear view image is presented at the determined time point on the display device 8.

Thus, the detection of the lane on which the vehicle 10 is running and the lane change made by the vehicle 10 and the running condition of the vehicle 11a to 11c around the vehicle 10 by processing data of the images taken by the cameras 1 to 3 enables an automatic start of the display of the side-rear view images at a proper time point, eliminating bothersome switch operations.

The display start judgment unit 6 determines when to start display of the images based on whether or not the vehicles 11a to 11c pass the display start threshold line 16a. The line 16a is positioned relative to the lane on which the vehicle 10 is running and which is detected by the lane change detection unit 4. Thus, it is assured the driver is made to recognize the vehicles 11a to 11c approaching to enter the side-rear blind spot area ranges 14c and 14d of the vehicle 10.

As shown in FIGS. 2E and 2F, even if the image in the frame moves in the horizontal direction as the vehicle 10 changes its lane, the display start threshold line 16a is adjusted to follow the side edge of the lane from which the vehicle 10 is departing. As described above, the display start threshold line 16a keeps its relative position with respect to the lane on which the vehicle 10 had been running, even if the vehicle 10 changes its lane, whereby the driver can recognize in the earlier stage that any of the vehicles 11a to 11c enters the lane which the vehicle 10 is entering and approaches the blind spot area range of the vehicle 10.

When the obstacle condition judgment unit 5 detects the running condition of the other vehicle 11a in the area to the rear of the vehicle 10, the display start threshold line 16a is set along each of the side edges of the lane (e.g., inside the side edges) on which the vehicle 10 is running. Thereby it can be surely detected that the vehicle 11a enters the side-rear blind spot area ranges 14c and 14d from the area to the rear of the vehicle 10. As shown in FIGS. 3A and 3B, when the vehicle 11a enters the blind spot area ranges 14c and 14d of the vehicle 10, moving straight from the area behind and close to the vehicle 10 to the area to the side of the vehicle 10, the vehicle 10 may become very close to the vehicle 11a. With respect to the vehicle 11a behind and close to the vehicle 10, the display start threshold lines 16a are set along the side edges of the lane on which the vehicle 10 is running, and the time point to start displaying the side-rear view image is determined based on the display start threshold line 16a, whereby the side-rear view image can be displayed before both of the vehicles become too close to each other.

Depending on the running condition of the vehicle 10 detected by the lane change detection unit 4 and the running condition of the vehicle 11a detected by the obstacle condition judgment unit 5, the images taken by the cameras 1 and 2 are highlighted. Thereby it is possible to get the driver alerted when particularly needed, and supply the driver with necessary information at the proper timing.

When the display of the side-rear view image is started while the lane change of the vehicle 10 has been detected by the lane change detection unit 4, one of the vehicles 11a to 11c causing the determination of the time point to start displaying the side-rear view image will be highlighted. Starting of the display of the side-rear view image while the vehicle 10 is changing its lane means that some of the vehicles 11a to 11c enter the blind spot area range on the side of the lane which the vehicle 10 enters and may become very close to the vehicle 10. The highlighted image of the vehicle draws the driver's attention sufficiently.

The image creating unit 7 includes a display of data of the running condition of the vehicles 11a to 11c; such as relative positions, directions, and speed of the vehicles 11a to 11c which are detected by the obstacle condition judgment unit 5, into the highlighted image. This enables the driver to obtain the information regarding the running conditions of the vehicles 11a to 11c.

Together with display of the highlighted image, the annunciator 9 beeps at the time point determined by the display start judgment unit 6, so that the driver can quickly acquire the information.

Second Embodiment

In the image display system according to the first embodiment, the image processing is performed on the all rear view images taken by three cameras including the rear view camera 3 so as to detect the running conditions of the obstacles (the other vehicles 11a to 11c) in the area around and to the rear of the vehicle 10. In the second embodiment, the system does not include the rear view camera 3, but only two side-rear view cameras 1 and 2. Images taken by the two cameras are subject to image processing to detect the running conditions of the obstacles (the other vehicles 11a to 11c) in the area alongside and to the rear of the vehicle 10. The second embodiment will be explained below in detail, although a part of the explanation overlaps with that of the first embodiment.

The images of FIG. 6A show how the lane of the vehicle 10 and the running condition of the vehicle 11b are detected. Time elapses from upper to lower as indicated by the arrows between the images. Each image is separated into segments. The image data of the segments are subjected to a contour extracting process to specify the positions of the track lane markers 15 and of the vehicle 11b on the segments. The lane change made by the vehicle 10 can be detected if the track lane markers 15 change their positions in each segment in a horizontal direction (x-axis). The running condition of the vehicle 11b can be determined based on the positional relationship between a given point within the region of the vehicle 11b on the image and the display start threshold line 16b. In this embodiment, the region of the vehicle 11b refers to a rectangular region 60 defined by two horizontal lines 60a passing through the uppermost and the lower most points on the extracted contour lines of the vehicle 11b nd two vertical lines 60b passing through the leftmost and the rightmost points on the contour line, and the above-mentioned given point refers to each of the left and right end points 60d of a horizontal line segment 60c passing through a center point of the region 60. In this embodiment, when either of the points 60d passes the display start threshold line 16b outward as shown in the images at the bottom of FIGS. 6A and 6B, the side-rear view image is started to be displayed. As shown in FIGS. 6A and 6B, when the vehicle 11b is running on the lane adjacent to the lane on which the vehicle 10 is running, the display start threshold line 16b is set along each of the boundaries of the side-rear blind spot area ranges 14c and 14d of the vehicle 10. This method is well applicable even if a plurality of vehicles are detected in the area in a overlapping manner. The running conditions of the vehicle 11b are not different, but those of the vehicle 10 are different between FIGS. 6A and 6B. The images of FIG. 6A indicate the vehicle 10 staying on the same lane, since the lane on which the vehicle 10 is running and the vehicle 11b maintain their horizontal position in the images. The images of FIG. 6B indicate the vehicle 10 changing the lane, since the lane on which the vehicle 10 is running and the vehicle 11b change their horizontal position in the images.

As shown in FIG. 7, the image display system in the second embodiment includes the left side-rear view camera 21, the right side-rear view camera 22, the controller 40 for processing data of the images taken by these cameras 21 and 22 and determining when to start displaying, a display device 28 for presenting one of the side-rear view images to the driver, and an annunciator 29 for making an acoustic warning signal such as a beep.

The controller 40 is provided inside the dashboard of the vehicle 10 (FIG. 1) and has a lane change detection unit 24 (first running condition computing unit) for determining the lane on which the vehicle 10 is running and detecting the lane change made by the vehicle 10 by processing data of the images taken by the cameras 21 and 22, an obstacle condition judgment unit 25 (second running condition computing unit) for judging the running conditions of the obstacles (the other vehicles 11a to 11c) in the area around and to the rear of the vehicle 10 by processing data of the images taken by the cameras 21 and 22, a display start judgment unit 26 for determining a time point to start display of one of the images taken by the cameras 21 and 22 depending on the lane on which the vehicle 10 is running or the lane change made by the vehicle 10 detected by the lane change detection unit 24 and the running conditions of the obstacles detected by the obstacle condition judgment unit 25, an image creating unit 27 for creating an highlighted images depending on the lane on which the vehicle 10 is running and the lane change made by the vehicle 10 detected by the lane change detection unit 24 and the running conditions of the obstacles detected by the obstacle running condition computing unit 25, and a storage unit 40a for storing image data.

The display device 28 is provided on the dashboard of the vehicle 10 (FIG. 1) and displays the side-rear view image (or may be the rear view image) which may be highlighted by the image creating unit 27 at the time point determined by the display start judgment unit 26 of the controller 40.

The annunciator 29 is provided in the vicinity of a driver's seat and beeps at the time point determined by the display start judgment unit 26 of the controller 40.

Figure 8:
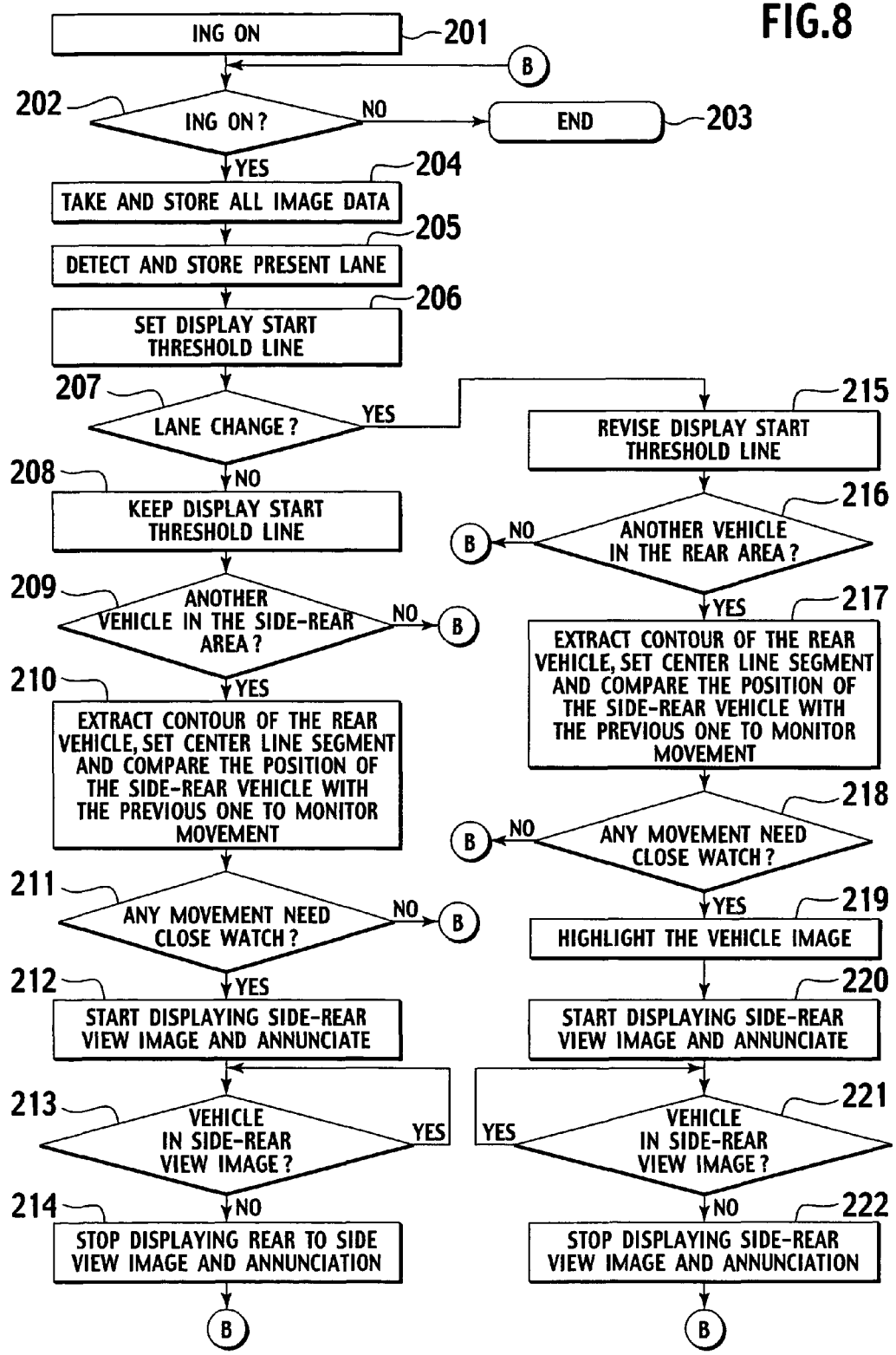
FIG. 8 shows a control flow chart of the image display system according to the second embodiment.

The lane change detection unit 24, the obstacle condition judgment unit 25, the display start judgment unit 26, and the image creating unit 27 in the controller 40 are control functions executed by a processor according to the flow chart shown in FIG. 8.

The display control flow of the image display system of the second embodiment will be described below with reference to the flow chart in FIG. 8.

When the driver turns the ignition ON in step 201, check is made to determine if the ignition is turned ON in step 202. If it is determined the ignition is turned OFF, the process ends in Step 203. If it is determined the ignition is turned ON, all data of images taken by the cameras 21 and 22 are read and stored in the storage unit 40a in Step 204.

Subsequently, in step 205, all image data are processed to specify the lane on which the vehicle 10 is running and then data of the lane is stored in the storage unit 40a.

Next, in step 206, a display start threshold line 16b is set based upon the specified lane of the vehicle 10 and data of the display start threshold line 16b is stored in the storage unit 40a.

In step 207, check is made to determine if the vehicle 10 is changing a lane. If it is determined that the vehicle 10 stays the same lane, the display start threshold line set in Step 206 is maintained (Step 208). If it is determined that the vehicle 10 is changing the lane, the display start threshold line 16b is revised according to the lane change made by the vehicle 10 (Step 215).

In step 209, data of all rear view images are processed to determine if there is the other vehicle 11b in the area alongside and to the rear of the vehicle 10. If it is determined that there is no other vehicle in the area, the process returns to Step 202. If it is determined that there is the other vehicle 11b in the area, a contour of the vehicle 11b is extracted and the line segment 60c in the region 60 of the vehicle 11b is set by image processing, and data of the contour of the vehicle 11b and the line segment 60c are stored in the storage unit 40a in Step 210.

Then, the positional relationship between the end points 60d of the line segment 60c and the display start threshold line 16b of the vehicle 11b in the image data currently processed (latter frame) are compared with those of the same vehicle 11b in the image data previously processed (former frame). In step 211, when the vehicle 11b shows movements on which the driver of the vehicle 10 needs to keep a close watch, in other words, when the end points 60d of the line segment 60c of the vehicle 11b previously lying inside the display start threshold line 16b on the former frame moved to the outside thereof on the latter frame, process proceeds to Step 212 to start the display of the side-rear view image and to beep as well. If the vehicle 11b shows no movement need to be closely watched, process returns to step 202.

Next, in Step 213, it is determined whether or not there is the other vehicle 11b in the area in the side-rear view camera range. If the other vehicle 11b is found to be in the area, the Step 213 is executed again to trace the vehicle 11b. If the other vehicle 11b is not found in the area, the display of the side-rear view image and the annunciation will be stopped in step 214, and then the process returns to step 202.

In step 215, the display start threshold line 16b is revised according to the lane change made by the vehicle 10. In other words, the position of each line element of the display start threshold line 16b on the screen image (the image in the screen frame) is revised so that each line element of the display start threshold line 16b maintains its position in the x-axis direction relative to side edge of the lane of the vehicle 10 or the track lane markers 15. Each line element maintains its position in a direction of Y-axis (ordinate) on the screen image.

Next, in step 216, as is the same with Step 209, data of all rear view images are processed to determine if there is the other vehicle 11b in the area alongside and to the rear of the vehicle 10. If it is determined that there is no other vehicle in the area, the process returns to Step 202. If it is determined that there is the other vehicle 11b in the area, a contour of the vehicle 11b is extracted and the line segment 60c in the region 60 of the vehicle 11a is set by image processing, and data of the contour of the vehicle 11b and the line segment 60c are stored in the storage unit 40a in Step 217.

Then, the positional relationship between the end points 60d of the line segment 60c and the display start threshold line 16b of the vehicle 11b in the image data currently processed (latter frame) are compared with those of the same vehicle 11b in the image data previously processed (former frame). In step 218, when the vehicle 11b shows movements on which the driver of the vehicle 10 needs to keep a close watch, in other words, when the end points 60d of the line segment 60c of the vehicle 11b previously lying inside the display start threshold line 16b on the former frame moved to the outside thereof on the latter frame, the boundary of the region 60 or the contour of the vehicle which has shown the movements need to be closely watched is subjected to the highlighting process as shown in FIGS. 2E and 2F in step 219. And then process proceeds to Step 220 to start the display of the side-rear view image and to beep as well. If the vehicle 11b shows no movement need to be closely watched, process returns to step 202.

Next, in Step 221, it is determined whether or not there is the other vehicle 11b in the area in the side-rear view camera range. If the other vehicle 11b is found to be in the area, the Step 221 is executed again to trace the vehicle 11b. If the other vehicle 11b is not found in the area, the display of the side-rear view image and the annunciation will be stopped in step 222, and then the process returns to step 202.

As described above, the image display system according to the second embodiment of the present invention includes the left side-rear view camera 21, and the right side-rear view camera 22. The system further includes the lane change detection unit 24 for determining the lane on which the vehicle 10 is running and detecting the lane change made by the vehicle 10 by processing data of the images taken by the cameras 21 and 22, and the obstacle condition judgment unit 25 for judging the running condition of the obstacles (the other vehicles 11a to 11c) in the area around and to the rear of the vehicle 10 by processing data of the images taken by the cameras 21 and 22. In addition the system includes the display start judgment unit 26 for determining a time point to start displaying of one of the images taken by the cameras 21 and 22 depending on the running condition of the vehicle 10 detected by the lane change detection unit 24 and the running conditions of the other vehicles 11a to 11c detected by the obstacle condition judgment unit 25, and the display device 28 for presenting one of the side-rear view images taken by the cameras 21 and 22 at the time point determined by the display start judgment unit 26.

In the method for controlling the display of the side-rear view image in the second embodiment, images to be processed are taken by the left side-rear view camera 21 and the right side-rear view camera 22. The taken images are processed to detect the lane on which the vehicle 10 is running and the lane change made by the vehicle 10, and to detect the running conditions of the vehicles 11a to 11c around the vehicle 10. Depending on the lane on which the vehicle 10 is running, the lane change made by the vehicle 10 and the running conditions of the vehicles 11a to 11c, the time point to start displaying the side-rear view image taken by the camera 21 or 22 is determined. The side-rear view image is presented at the determined time point on the display device 28.

Thus, the detection of the lane on which the vehicle 10 is running and the lane change made by the vehicle 10 and the running condition of the vehicle 11a to 11c around the vehicle 10 by processing data of the images taken by the cameras 21 and 22 enables an automatic start of the display of the side-rear view images at a proper time point, eliminating bothersome switch operations.

The display start judgment unit 26 determines when to start display of the images based on whether or not the vehicles 11a to 11c pass the display start threshold line 16b. The line 16b is positioned relative to the lane on which the vehicle 10 is running and which is detected by the lane change detection unit 24. Thus, it is assured the driver is made to recognize the vehicles 11a to 11c approaching to enter the side-rear blind spot area ranges 14c and 14d of the vehicle 10.

As shown in FIGS. 2E and 2F, even if the image in the frame moves in the horizontal direction as the vehicle 10 changes its lane, the display start threshold line 16b is adjusted to follow the side edge of the lane from which the vehicle 10 is departing. As described above, the display start threshold line 16b keeps its relative position with respect to the lane on which the vehicle 10 had been running, even if the vehicle 10 changes its lane, whereby the driver can recognize in the earlier stage that any of the vehicles 11a to 11c enters the lane which the vehicle 10 is entering and approaches the blind spot area range of the vehicle 10.

In the case that the obstacle condition judgment unit 25 detects the running condition of the vehicle 11b running on the lane adjacent to the lane on which the vehicle 10 is running based on the movement thereof, the display start threshold line 16b is set along each of the boundaries of the side-rear blind spot area ranges 14c and 14d of the vehicle 10, for example, on the rear side of the boundaries. Thereby it can be surely detected that the vehicle 11b enters the side-rear blind spot area ranges 14c and 14d of the vehicle 10 from the areas in the limited side mirror field of view 14a and 14b. For the vehicle 11b in the area alongside and to the far rear of the vehicle 10, running straight on the adjacent lane at a fast speed to takeover the vehicle 10, as shown in FIGS. 2A and 2D, the display start threshold line 16b is set along each of the boundaries of the blind spot area ranges 14c and 14d of the vehicle 10, whereby the display of the side-rear view image can be started based on the display start threshold line 16b before both of the vehicles become too close to each other.

Depending on the running condition of the vehicle 10 detected by the lane change detection unit 24 and the running condition of the vehicle 11b detected by the obstacle condition judgment unit 25, the images taken by the cameras 21 and 22 are highlighted. Thereby it is possible to get the driver alerted when particularly needed, and supply the driver with necessary information at the proper timing.

When the display of the side-rear view image is started while the lane change of the vehicle 10 has been detected by the lane change detection unit 24, one of the vehicles 11a to 11c causing the determination of the time point to start displaying the side-rear view image will be highlighted. Starting of the display of the side-rear view image while the vehicle 10 is changing its lane means that some of the vehicles 11a to 11c enter the blind spot area range on the side of the lane which the vehicle 10 enters and may become very close to the vehicle 10. The highlighted image of the vehicle draws the driver's attention sufficiently.

The image creating unit 27 includes a display of data of the running condition of the vehicles 11a to 11c; such as relative positions, directions, and speed of the vehicles 11a to 11c which are detected by the obstacle condition judgment unit 25, into the highlighted image. This enables the driver to obtain the information regarding the running conditions of the vehicles 11a to 11c.

Together with display of the highlighted image, the annunciator 29 beeps at the time point determined by the display start judgment unit 26, so that the driver can quickly acquire the information.

The preferred embodiments described herein are illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matters contained in Japanese Patent Application No. 2003-411626, filed on Dec. 10, 2003, the disclosure of which is expressly incorporated herein by reference in its entirety.

What is claimed is:

1. An image display system provided on a vehicle, comprising:
    a first image taking device which takes both a right side-rear view image of a first area along the right side and to the rear of the vehicle and a rear view image of a second area to the rear of the vehicle, or at least the right side-rear view image;
    a second image taking device which takes both a left side-rear view image of a third area along the left side and to the rear of the vehicle and the rear view image of the second area, or at least the left side-rear view image;
    a first running condition computing unit which performs image processing on data of the images taken by the first and second image taking devices, and which thereby detects a road lane in which the vehicle is running, to compute a running condition of the vehicle indicating whether the vehicle is making a lane change, wherein the first running condition computing unit sets a right threshold line at the right side of the road lane and a left threshold line at the left side of the road lane, the right and left threshold lines being positioned relative to the road lane;
    a second running condition computing unit which performs image processing on data of the images taken by the first and second image taking devices, to compute a running condition of an obstacle in the first area or in the second area or in the third area;
    a display start judgment unit which determines a first display start time point to start displaying the right side-rear view image and a second display start time point to start displaying the left side-rear view image based on the running conditions of the vehicle and the obstacle computed by the first and second running condition computing units, wherein the display start judgment unit determines the first display start time point as being a time point at which a first point in a defined region of the obstacle in the images processed by the second running condition computing unit passes the right threshold line and determines the second display start time point as being a time point at which a second point in the defined region of the obstacle passes the left threshold line; and
    a presenting device which starts displaying the right side-rear view image at the first display start time point and starts displaying the left side-rear view image at the second display start time point.

2. The image display system according to claim 1, wherein the right and left threshold lines are set to maintain their positions relative to the road lane as the vehicle makes the lane change.

3. The image display system according to claim 1, wherein, when the second running condition computing unit computes the running condition of the obstacle in the second area, the right and left threshold lines are set along the right and left sides of the road lane in which the vehicle is running, respectively.

4. The image display system according to claim 1, wherein when the second running condition computing unit computes the running condition of the obstacle in the first area or in the third area, the right threshold line is set along a right side boundary of a right side blind-spot area of the vehicle and the left threshold line is set along a left side boundary of a left side blind-spot area of the vehicle.

5. The image display system according to claim 1, further comprising;
    an image creating unit for creating a highlighted side-rear view image with the obstacle highlighted therein depending on the running conditions of the vehicle and the obstacle computed by the first and second running condition computing units.

6. The image display system according to claim 5, wherein the presenting device presents the highlighted side-rear view image with the obstacle causing the determination of the display start time point highlighted, as the first running condition computing unit detects the vehicle making the lane change.

7. The image display system according to claim 5, wherein the second running condition computing unit computes a relative position, direction, or speed of the obstacle, and
the image creating unit includes a display of data thereof in the highlighted side-rear view image.

8. The image display system according to claim 1, further comprising:
an annunciator which beeps at the first display start time point or at the second display start time point determined by the display start judgment unit.

9. An image display control method for an image display system, comprising:
taking both a right side-rear view image of a first area along the right side and to the rear of a vehicle and a rear view image of a second area to the rear of the vehicle, or at least the right side-rear view image, by a first image taking device;
taking both a left side-rear view image of a third area along the left side and to the rear of the vehicle and the rear view image of the second area, or at least the left side-rear view image, by a second image taking device;
performing image processing on data of the images taken by the first and second image taking devices, thereby detecting a road lane in which the vehicle is running, to compute a running condition of the vehicle indicating whether the vehicle is making a lane change, and setting a right threshold line at the right side of the road lane and a left threshold line at the left side of the road lane, the right and left threshold lines being positioned relative to the road lane, by a controller;
performing image processing on data of the images taken by the first and second image taking devices, to compute a running condition of an obstacle in the first area or in the second area or in the third area, by the controller;
determining a first display start time point to start displaying the right side-rear view image and a second display start time point to start displaying the left side-rear view image based on the computed running conditions of the vehicle and the obstacle, by the controller, wherein the first display start time point is determined as being a time point at which a first point in a defined region of the obstacle in the images processed by the controller passes the right threshold line and the second display start time point is determined as being a time point at which a second point in the defined region of the obstacle passes the left threshold line; and
starting displaying, by a presenting device, the right side-rear view image at the first display start time point and the left side-rear view image at the second display start time point.

10. The image display control method according to claim 9, wherein the right and left threshold lines are set to maintain their positions relative to the road lane as the vehicle makes the lane change.

11. The image display control method according to claim 9, wherein, when computing the running condition of the obstacle in the second area, the right and left threshold lines are set along the right and left sides of the road lane in which the vehicle is running, respectively.

12. The image display control method according to claim 9, wherein, when computing the running condition of the obstacle in the first area or in the third area, the right threshold line is set along a right side boundary of a right side blind-spot area of the vehicle and the left threshold line is set along a left side boundary of a left side blind-spot area of the vehicle.

13. The image display control method according to claim 9, further comprising:
creating a highlighted side-rear view image with the obstacle highlighted therein depending on the computed running conditions of the vehicle and the obstacle.

14. The image display control method according to claim 13, wherein the highlighted side-rear view image is presented with the obstacle causing the determination of the display start time point highlighted, as the lane change of the vehicle is detected by processing data of the taken images.

15. The image display control method according to claim 13, wherein a relative position, direction, or speed of the obstacle is computed, and a display of data thereof is included in the highlighted side-rear view image.

16. An information presenting system provided on a vehicle, comprising:
a first image taking device which takes both a right side-rear view image of a first area along the right side and to the rear of the vehicle and a rear view image of a second area to the rear of the vehicle, or at least the right side-rear view image;
a second image taking device which takes both a left side-rear view image of a third area along the left side and to the rear of the vehicle and the rear view image of the second area, or at least the left side-rear view image;
a first running condition computing unit which performs image processing on data of the images taken by the first and second image taking devices, and which thereby detects a road lane in which the vehicle is running, to compute a running condition of the vehicle indicating whether the vehicle is making a lane change, wherein the first running condition computing unit sets a right threshold line along the right side of the road lane and a left threshold line along the left side of the road lane, the right and left threshold lines being positioned relative to the road lane;
a second running condition computing unit which performs image processing on data of the images taken by the first and second image taking devices, to compute a running condition of an obstacle running in the first area or in the second area or in the third area;
a presentation start judgment unit which determines, based on the running conditions of the vehicle and the obstacle computed by the first and second running condition computing units, a first presentation start time to start presenting a first information of the obstacle running in the first area or moving into the first area and a second presentation start time to start presenting a second information of the obstacle running in the third area or moving into the third area, wherein the presentation start judgment unit determines the first presentation start time as being a time point at which a first point in a defined region of the obstacle in the images processed by the second running condition computing unit passes the right threshold line and determines the second presentation start time as being a time point at which a second point in the defined region of the obstacle passes the left threshold line; and
a presenting device which starts presenting the first information at the first presentation start time and starts presenting the second information at the second presentation start time.

17. An image display control method for an image display system, comprising:
- taking both a right side-rear view image of a first area along the right side and to the rear of a vehicle and a rear view image of a second area to the rear of the vehicle, or at least the right side-rear view image, by a first image taking device;
- taking both a left side-rear view image of a third area along the left side and to the rear of the vehicle and the rear view image of the second area, or at least the left side-rear view image, by a second image taking device;
- performing image processing on data of the images taken by the first and second image taking devices, thereby detecting a road lane in which the vehicle is running, to compute a running condition of the vehicle indicating whether the vehicle is making a lane change, and setting a right threshold line at the right side of the road lane and a left threshold line at the left side of the road lane, the right and left threshold lines being positioned relative to the road lane, by a controller;
- performing image processing on data of the images taken by the first and second image taking devices, to compute a running condition of an obstacle running in the first area or in the second area or in the third area, by the controller;
- determining, based on the running conditions of the vehicle and the obstacle computed by the controller, a first presentation start time to start presenting a first information of the obstacle running in the first area or moving into the first area and a second presentation start time to start presenting a second information of the obstacle running in the third area or moving into the third area, wherein the first presentation start time is determined as being a time point at which a first point in a defined region of the obstacle in the images processed by the controller passes the right threshold line and the second presentation start time is determined as being a time point at which a second point in the defined region of the obstacle passes the left threshold line; and
- starting presenting, by a presenting device, the first information at the first presentation start time and the second information at the second presentation start time.

* * * * *